US007009768B2

(12) United States Patent
Sakamoto

(10) Patent No.: US 7,009,768 B2
(45) Date of Patent: Mar. 7, 2006

(54) OPTICAL COMPONENT AND METHOD OF MANUFACTURING SAME

(75) Inventor: Junichi Sakamoto, Kanagawa (JP)

(73) Assignee: Canon Kabushiki Kaisha, Toyko (JP)

( * ) Notice: Subject to any disclaimer, the term of this patent is extended or adjusted under 35 U.S.C. 154(b) by 0 days.

(21) Appl. No.: 10/454,248

(22) Filed: Jun. 3, 2003

(65) Prior Publication Data

US 2003/0223118 A1    Dec. 4, 2003

(30) Foreign Application Priority Data

Jun. 4, 2002   (JP)   ............................. 2002-162258
Apr. 24, 2003  (JP)   ............................. 2003-119353

(51) Int. Cl.
   *G02B 5/30*   (2006.01)
   *G02B 5/18*   (2006.01)
   *G03F 7/00*   (2006.01)

(52) U.S. Cl. ...................... 359/486; 359/500; 359/576; 359/900; 216/24

(58) Field of Classification Search ................ 359/486, 359/576, 587, 500, 900; 216/24
See application file for complete search history.

(56) References Cited

U.S. PATENT DOCUMENTS

| | | | | |
|---|---|---|---|---|
| 4,068,260 A | * | 1/1978 | Ohneda et al. | ............. 348/291 |
| 4,712,881 A | * | 12/1987 | Shurtz et al. | ................ 359/352 |
| 4,927,236 A | * | 5/1990 | Keilmann | .................... 359/486 |
| 5,254,202 A | * | 10/1993 | Kaplan | .................... 156/345.1 |
| 6,532,111 B1 | * | 3/2003 | Kurtz et al. | ................. 359/486 |
| 6,577,442 B1 | * | 6/2003 | Goldstein | ................... 359/361 |

FOREIGN PATENT DOCUMENTS

| | | |
|---|---|---|
| EP | 1 103 829 A1 | 8/1999 |
| JP | 9-304611 | 11/1997 |
| JP | 10-59746 | 3/1998 |
| JP | 11-95027 | 4/1999 |
| JP | 11-0176065 | 6/1999 |
| JP | 2000-56133 | 2/2000 |
| JP | 2000-292617 | 10/2000 |
| JP | 2001-165568 A | 6/2001 |

OTHER PUBLICATIONS

Rong-Chung Tyan, et al., "Design, fabrication, and characterization on form-birefringent multilayer polarizing beam splitter", Josa A, vol. 14, No. 7, pp 1627-1636, Jul. 1997.*
V. V. Martynov, et al., "Lamellar Multilayer Gratings with Very High Diffraction Efficiency", SPIE vol. 3150, pp. 2-8, Nov. 1997.*

(Continued)

*Primary Examiner*—John Juba, Jr.
(74) *Attorney, Agent, or Firm*—Morgan & Finnegan, LLP

(57) ABSTRACT

A multilayer film having two kinds of films of different refractive indexes alternately stacked on each other on a substrate composed of an optical element is formed in a plurality of parallel lines, and the adjacent lines of the multilayer film are connected to each other by means of a connecting multilayer film to reinforce them. This makes it possible to provide a highly reliable optical component which shows good polarization characteristic even for a visible light of a wavelength of 400 to 700 nm and in which even when designed to have a high aspect ratio, the linear multilayer film will not fall down. There is also provided a manufacturing method that enables a fine recess/protrusion shape to be surely formed using an inexpensive manufacturing apparatus without use of any organic solvent.

6 Claims, 6 Drawing Sheets

OTHER PUBLICATIONS

Tyan, et al. Optics Letters—Polarizing beam splitter based on the anisotropic spectral reflectivity characteristic of form-birefringent multilayer gratings; Optics Letters, Optical Society of America, vol. 21, No. 10, p. 761, 1996.

European Search Report, dated Aug. 20, 2003.

Lopez, A.G. and H.G. Craighead "Wave-plate polorizing beam splitter based on an form-birefringent multilayer grating" Optics Letters Oct. 15, 1998/ vol. 23, No. 20.

Official Letters/Search Report dated Sep. 29, 2005.

* cited by examiner

OPTICAL COMPONENT AND METHOD OF MANUFACTURING SAME

BACKGROUND OF THE INVENTION

1. Field of the Invention

The present invention relates to an optical component such as a polarizing beam splitter or a phase plate in which a multilayer film is provided on a surface of a substrate to polarize incident light, and in particular, to an optical component having a multilayer film with a high aspect ratio as well as a method of manufacturing the same.

2. Related Background Art

Hitherto, an optical component such as a lens, used in an electronic equipment is based on an optical interference and has thin layers stacked on a surface of an optical element as an antireflection film. Further, on the basis of a similar optical interference, thin layers are stacked on a surface of a substrate composed of a transparent optical element to polarize an incident light, thereby forming a polarizing beam splitter or a phase plate. Such an interference film is inexpensive and has good reproducibility, and is thus put to practical use widely.

FIG. 5 shows an example of a conventionally used interference film cubic type polarizing beam splitter. In FIG. 5, reference numerals 12a and 12b denote transparent body substrates each having a surface inclined at 45°. Reference numerals 13 and 14 denote a low refractive index layer and a high refractive index layer, respectively. Further, the arrows shown in the figure indicate the direction in which a light travels. A normal light has a S polarization beam that is a vibration component having a light vibrating direction perpendicular to the drawing of FIG. 5 and a P polarization beam that is a vibration component having a light vibrating direction parallel to the drawing of FIG. 5. The polarizing beam splitter can split an incident light into two components as shown in the figure by allowing the P polarization beam to pass therethrough while reflecting the S polarization beam.

However, although the cubic type polarizing beam splitter shown in FIG. 5 is very easy to manufacture and has good reproducibility, there is a problem as to its optical characteristics that the reflection and transmission characteristics change markedly depending on the incident angle of light.

For example, when the size of a device such as a liquid crystal projector is to be reduced, its optical path length must be shortened. The use of the conventionally used interference film cubic type polarizing beam splitter enables the optical path length to be shortened. However, because the angle at which a light is incident on the polarizing beam splitter varies markedly depending on the position of the incidence, the reflection or transmission characteristics are not constant, thus making it impossible to obtain uniform spectral characteristics within a plane. Therefore, to further improve the functions of electronic equipments, there is a need for an optical component such as a polarizing beam splitter or a phase plate that provides good optical characteristics, regardless of the incident angle of light.

To meet this need, a polarizer has recently been proposed which polarizes an incident light utilizing the anisotropy of propagation characteristics of the periodic structure of a transparent body and in which high refractive index layers and low refractive index layers are repeatedly stacked alternately on each other to provide a groove form that is bent periodically at a pitch less than the wavelength of visible light as disclosed in Japanese Patent Application Laid-Open No. 2000-56133. This publication describes the use of Si, GaAs, $TiO_2$, and $TaO_2$ as the high refractive index layer and the use of $SiO_2$ as the low refractive index layer. Further, this publication describes an example in which the high refractive index and the low refractive index layers has a periodic thickness of 0.32 $\mu$m and in which the groove has a pitch of 0.4 $\mu$m and a depth of 0.2 $\mu$m.

With the configuration described in Japanese Patent Application Laid-Open No. 2000-56133 above, the polarizer can effectively function as a polarizing beam splitter for a light of a wavelength of 1 $\mu$m. However, the polarizer is difficult to use if an incident light to be polarized is a visible light having a wavelength of 400 to 700 nm. That is, Si and GaAs that constitute the high refractive index layer has a low transmissivity for visible light. Thus, the polarizer is difficult to use in an optical component such as a liquid crystal projector which must allow a light of a visible range to pass therethrough. Further, because the difference between the refractive index of $TiO_2$ and $TaO_2$ constituting the high refractive index layer and that of $SiO_2$ constituting the low refractive index layer is too small, sufficient polarization characteristics cannot be obtained.

OPTICS LETTERS (Rong-Chung et al., Vol. 21, No. 10, p. 761, 1996) describes a polarizing beam splitter comprising a plurality of dielectric multilayer films arranged in lines on a transparent substrate as shown in FIG. 6. In FIG. 6, reference numeral 21 denotes an optical component such as a beam splitter or a polarizing plate. Reference numeral 22 denotes a transparent substrate as an optical element, and reference numerals 23 and 24 denote low refractive index and high refractive index layers, respectively. The low refractive index layers 23 and the high refractive index layers 24 are alternately stacked on a surface of the transparent substrate 22 to form an HL alternate layer 25. Reference numerals 26a, 26b, 26c, 26d denote dielectric multilayer films each formed in a line. It is known that the line-shaped dielectric multilayer films 26a, 26b, 26c, 26d which form periodic recesses and protrusions function as a diffraction grating and have excellent characteristics as an optical component that polarizes an incident light. Specifically, even if an incident light is a visible light having a wavelength of 400 to 700 nm, good polarization characteristics can in principle be obtained by making the line width of each of the line-shaped dielectric multilayer films less than the wavelength of the visible light, preferably 0.1 $\mu$m or less. Further, for its manufacturing method, a patterning technology for a super LSI can be applied to manufacture the periodic recesses and protrusions using dielectric multilayer films. Examples of known patterning technology include wet etching using an etchant such as hydrofluoric acid, dry etching such as reactive ion etching, or the like.

However, when a polarizing beam splitter is manufactured using the line-shaped dielectric multilayer films shown in FIG. 6, a wet process will be performed in an etching step or washing step, as described above. Further, a drying step is required after this wet process. Thus, a processing liquid flowing into the recesses during the above steps pulls the protrusions by a capillary force, so that a stress is applied to the dielectric multilayer films as the protrusions to incline them. This tendency is significant when in the recesses and protrusions formed by the line-shaped dielectric multilayer films, the thickness of the dielectric multilayer film is relatively greater as compared with the width of the recess, i.e., the aspect ratio of the recesses and protrusions is high. This tendency becomes very significant particularly when the aspect ratio is 4 or more.

As a manufacturing method for avoiding this, Japanese Patent Application Laid-Open No. 2001-165568 discloses a drying method utilizing a supercritical state. According to this method, a processed pattern is immersed into normal hexane as a nonpolar solvent, and then sealed together with liquid carbon dioxide in a reaction chamber, so that the normal hexane is replaced with the liquid carbon dioxide to dry the processed pattern. This method is effective in preventing defects in the pattern. However, the inner pressure of the reaction chamber must be set to 7.5 MPa, thus requiring a high pressure container. Further, an organic solvent is required as a nonpolar solvent, which may pollute the environment.

SUMMARY OF THE INVENTION

It is, therefore, an object of the preset invention to provide an optical component that can show good polarization characteristics for a visible light of a wavelength of 400 to 700 nm.

It is another object of the present invention to stably maintain, during a manufacturing process or practical use, the shape of dielectric multilayer films formed with a fine recess/protrusion shape on a surface of an optical element even when the dielectric multilayer films have a high aspect ratio.

It is yet another object of the present invention to provide a manufacturing method capable of surely forming such fine recesses and protrusions using an inexpensive manufacturing apparatus without use of any organic solvent.

To accomplish these objects, a first aspect of the present invention provides an optical component comprising a multilayer film having two kinds of alternately stacked layers of different refractive indexes formed in a plurality of parallel lines on a substrate comprised of an optical element, the plurality of parallel lines of the multilayer film each having a width smaller than a wavelength of visible light and being arranged at an interval smaller than the wavelength of visible light; and a connecting multilayer film that connects the adjacent lines of the multilayer film to each other at at least one position and has the same layer configuration as that of the multilayer film.

In the present invention, it is preferable that the connecting multilayer film has a width smaller than a wavelength of visible light.

Furthermore, it is preferable in the present invention that the adjacent lines of the multilayer film are connected to each other at at least two positions by the connecting multilayer film, and the interval between the adjacent connecting multilayer films is five or more times the wavelength of visible light.

Moreover, it is preferable in the present invention that the linear multilayer film has an aspect ratio of 4 or more.

Further, a second aspect of the present invention provides an optical component comprising a multilayer film having two kinds of alternately stacked layers of different refractive indexes formed on a substrate comprised of an optical element, wherein the multilayer film is formed in a shape of a crib (i.e., continuous, ‡or semi ‡shape) of a pattern consisting of those parts having the multilayer film formed on the substrate and those parts having no multilayer film formed on the substrate, and those parts of the crib shaped multilayer film which are arranged parallel to each other in one direction each have a width smaller than a wavelength of visible light and are adjacent to each other at an interval smaller than the wavelength of visible light.

Furthermore, in the present invention, it is preferable that those parts of the crib shaped multilayer film which are arranged parallel to each other in another direction each have a width smaller than a wavelength of visible light and are adjacent to each other at an interval which is five or more times the wavelength of visible light.

Moreover, in the present invention, it is preferable that the crib shaped multilayer film has an aspect ratio of 4 or more.

Further, a third aspect of the present invention provides a method of manufacturing an optical component comprising the steps of:

alternately stacking two kinds of layers of different refractive indexes on a substrate composed of an optical element to form a multilayer film;

forming an intermediate layer on the multilayer film;

forming a resist layer on the intermediate layer;

patterning the resist layer in a crib shape (i.e., continuous, ‡or semi ‡shape);

etching the intermediate layer using the resist layer as a mask;

etching the multilayer film using the intermediate layer as a mask; and removing the intermediate layer and then performing cleaning, thereby providing an optical component having the crib shaped multilayer film formed on the substrate.

Furthermore, in the present invention, it is preferable that those parts of the crib shaped multilayer film which are arranged parallel to each other in one direction each have a width smaller than a wavelength of visible light and are adjacent to each other at an interval smaller than the wavelength of visible light.

Furthermore, according to the present invention, those parts of the crib shaped multilayer film which are arranged parallel to each other in another direction each have a width smaller than a wavelength of visible light and are adjacent to each other at an interval which is five or more times the wavelength of visible light.

Moreover, in the present invention, it is preferable that the crib shaped multilayer film has an aspect ratio of 4 or more.

The above and other objects of the invention will become more apparent from the following description taken in conjunction with the accompanying drawings.

DESCRIPTION OF THE PREFERRED EMBODIMENTS

Figure 1:
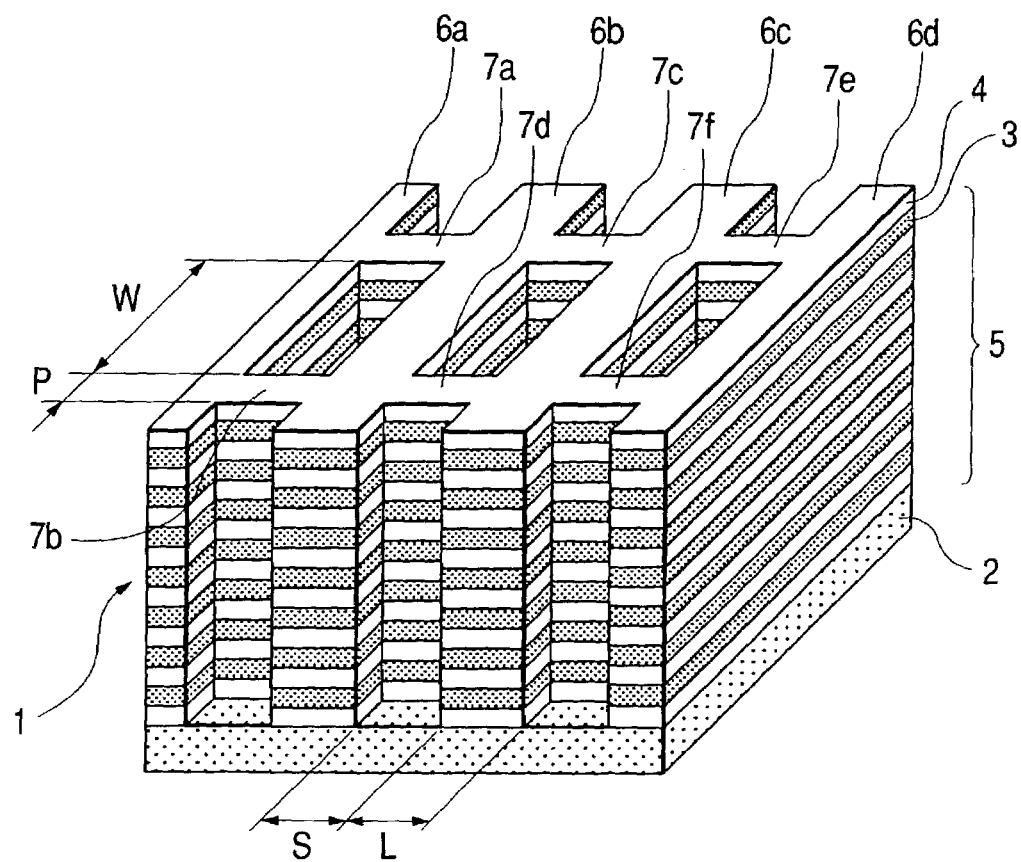
FIG. 1 is a perspective view of a polarizing beam splitter according to a first embodiment.

FIG. 1 is a perspective view of a polarizing beam splitter as an optical component according to a first embodiment of the present invention. In FIG. 1, reference numeral 1 denotes a polarizing beam splitter. Reference numeral 2 denotes a transparent substrate that is an optical element. Reference numerals 3 and 4 denote low refractive index layers and high refractive index layers, respectively. The low refractive index layers 3 and the high refractive index layers 4 are alternately stacked on each other on a surface of the transparent substrate 2 to form an HL alternate layer 5. As the transparent substrate 2, there may be used a material that is transparent in the visible range, such as quartz, optical glass, or a transparent plastic material such as acrylic resin. As the low refractive index layers 3, there may be used $SiO_2$, $MgF_2$, $Na_2AlF_6$, or a mixed composition thereof. As the high refractive index layers 4, there may be used $ZrO_2$, $TiO_2$, $Ta_2O_5$, $CeO_2$, or a mixed composition thereof.

The low and high refractive index layers 3 and 4 each have a thickness which is equal to or less than ¼ of a wavelength λ and which is set at about 70 to 170 nm, so that the polarizing beam splitter 1 provides a polarization function. Reference numerals 6a, 6b, 6c, 6d denote a multilayer film formed in a linear shape. Reference numerals 7a, 7b denote connecting multilayer films that are arranged substantially perpendicularly to the lines 6a, 6b of the multilayer film to connect the lines to each other. Similarly, reference numerals 7c, 7d denote connecting multilayer films that connect the lines 6b, 6c of the multilayer film to each, and reference numerals 7e, 7f denote connecting multilayer films that connect the lines 6c, 6d of the multilayer film to each other. Accordingly, the lines 6a, 6b, 6c, 6d and the connecting multilayer films 7a, 7b, 7c, 7d, 7e, 7d together constitute a crib shaped (here, two ‡and two semi ‡shape) multilayer film.

The width L of each of the lines 6a, 6b, 6c, 6d of the multilayer film is set to be smaller than a wavelength of visible light of from 400 to 700 nm. Further, to improve the dependence of spectral characteristics on a light incident angle, the width L is preferably set at 100 nm or less. Further, the interval S between the adjacent lines 6a and 6b, 6b and 6c, and 6c and 6d of the multilayer films is similarly set to be smaller than a wavelength of visible light of from 400 to 700 nm. Further, to improve the dependence of the spectral characteristics on a light incident angle, the interval S is preferably set at 100 nm or less.

These values are the results of attempts to improve performance by optimizing the refractive index modulation between a structural portion and an air gap using a numerical analysis program for Rigorous Coupled-Wave Analysis (RCWA), with consideration of dependence of the period and film thickness on the wavelength.

Further, the width P of each of the connecting multilayer films 7a, 7b, 7c, 7d, 7e, 7f is set to be smaller than a wavelength of visible light of from 400 to 700 nm. This is because if the width P is greater than a wavelength of visible light, the connecting multilayer films become discontinuous portions with respect to visible light, so that the characteristics are degraded with these portions as originating points, thus failing to obtain uniform optical characteristics. Further, to improve the dependence of the spectral characteristics on a light incident angle, this width is preferably set at 100 nm or less. Further, the interval between the adjacent connecting multilayer films 7a and 7b, 7c and 7d, and 7e and 7f is set to be five or more times the wavelength of visible light of from 400 to 700 nm. It is believed that this provides a gap greater than a coherent length for natural light, thus reducing an adverse effect on the optical characteristics of the optical component. Incidentally, the shape of the connecting multilayer films 7a, 7b, 7c, 7d, 7e, 7f is not particularly limited and may be beam shape, cylindrical, polygonal, or the like.

Further, the multilayer film need not necessarily be formed in a crib shape, and the connecting multilayer films 7a, 7b, 7c, 7d, 7e, 7f may be shaped like a beam, cylinder, polygon, or the like. Further, the connecting multilayer films 7a, 7b, 7c, 7d, 7e, 7f may be provided so as to form a stagger pattern between the lines 6a, 6b, 6c, 6d of the multilayer film. Further, adjacent ones of the lines 6a, 6b, 6c, 6d of the multilayer film need not necessarily be connected to each other by the two connecting multilayer films and may be connected by use of three or more connecting multilayer films. Further, the connection may be made by use of only a single connecting multilayer film provided that a predetermined strength can be obtained.

Next, description will be given of a method of manufacturing the previously described polarizing beam splitter. The photolithography method that is a patterning technique for super LSI is applicable to the manufacture of the polarizing beam splitter in accordance with the present embodiment. The photolithography method is to provide a processing substrate with an arbitrary pattern shape through a resist coating step, an exposure step, a developing step, an etching step, and a stripping step. FIGS. 2A to 2H are sectional views illustrating the method of manufacturing the polarizing beam splitter.

Figure 2A:
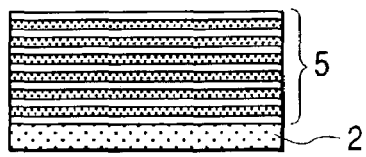
FIGS. 2A, 2B, 2C, 2D, 2E, 2F, 2G and 2H are sectional views showing a process of manufacturing the polarizing beam splitter according to the first embodiment.

First, as shown in FIG. 2A, the low refractive index layers 3 and the high refractive index layers 4 are alternately stacked on the transparent substrate 2 by a general thin film manufacturing technology such as evaporation, sputtering, ECR, or CVD, to form an HL alternate layer 5 composed of six to eight layers. In this case, the low refractive index layers 3 and the high refractive index layers 4 each have a film thickness already designed according to functions required for the polarizing beam splitter. In general, the low refractive index layers 3 are made of $SiO_2$, and the high refractive index layers 4 are made of $TiO_2$.

Figure 2B:
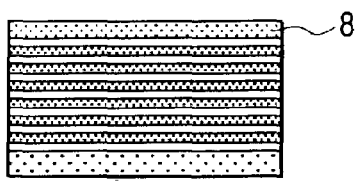

Next, as shown in FIG. 2B, an intermediate layer 8 is formed on the HL alternate layer 5 by the sputtering method. The intermediate layer 8 functions as a mask during an etching step described later. The intermediate layer 8 is preferably made of a material that has a low reactivity with an etchant used in the etching step described later and can selectively be removed from the optical component structural member during a stripping step described later. In general, when the material of each of the linearly shaped multilayer films 6a, 6b, 6c, 6d and the connecting multilayer films 7a, 7b, 7c, 7d, 7e, 7f is a dielectric consisting of the low refractive index layers 3 made of $SiO_2$, $MgF_2$, $Na_2AlF_6$, or a mixed composition thereof and the high refractive index layer 4 made of $ZrO_2$, $TiO_2$, $Ta_2O_5$, $CeO_2$, or a mixed composition, then the material of the intermediate layer 8 may be a metal such as Cr, Ni, Ti, Al, Cu, or the like. The thickness of the intermediate layer 8 is not particularly limited as long as it is enough for the intermediate layer 8 to function effectively as a mask during a step of etching the underlying dielectric layer. The intermediate layer 8 may generally be formed to have a thickness of about several tens to several hundreds of nm.

Figure 2C:
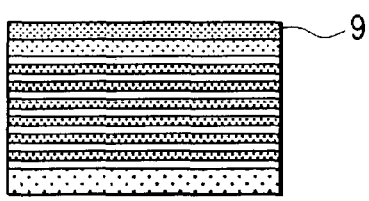

Next, as shown in FIG. 2C, a resist layer 9 is formed on the intermediate layer 8 by a spin coating method. In general, the thinner the resist film, the more easily a fine pattern can be formed. In order to form a fine pattern of a size of 1 μm or less as in the case with the present embodiment, it is advantageous to form the resist film as thinly as possible, and formation in a thickness of 300 nm or less is specifically required. Further, the type of the resist film 9 used is not particularly limited and various types including a positive type, a negative type, a chemical amplification type, or the like can be used as long as it allows a designed structure to be obtained. Further, it is preferable that the material for the resist film 9 is selected so as to have a good exposure sensitivity for a dominant wavelength of a light source of an exposure device.

Figure 2D:
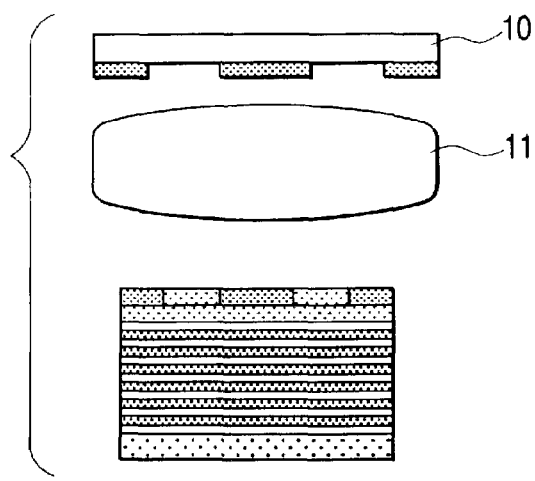

Then, as shown in FIG. 2D, the resist film 9 formed in the step shown in FIG. 2C is exposed in a predetermined pattern using a mask 10 by means of an optics reduction projection system 11. When a shape of a size smaller than a wavelength of visible light is patterned as in the case with the present embodiment, an excimer light source stepper using a phase-shift mask or the like is used as an aligner. When the excimer light source stepper is used, a pattern of a size of about 0.1 $\mu$m can be formed. Further, if an EB direct drawing system is used as an exposure system, a finer pattern of a size of about 0.05 $\mu$m can be formed. Further, when the mass-productivity is taken into consideration, the interference lithography is effectively used. When an ArF excimer laser is used as a light source for the interference lithography, a pattern of a size of about 0.05 $\mu$m can be obtained.

Figure 2E:
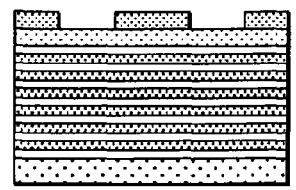

Then, as shown in FIG. 2E, the pattern exposed in the step of FIG. 2D is subjected to PEB (Post Exposure Bake) and then developed with an alkaline solution to form the predetermined pattern.

Figure 2F:
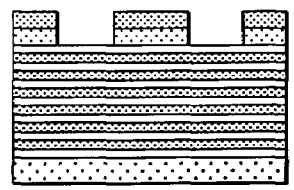

Then, as shown in FIG. 2F, the resist layer 9 is used as a mask to etch the intermediate layer 8 for patterning. As the etching liquid, an etchant can be used to which the intermediate layer is soluble and the resist is insoluble or soluble with difficulty. Further, in this case, dry etching can also be used.

Figure 2G:
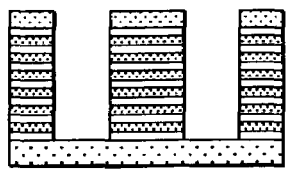

Next, as shown in FIG. 2G, the HL alternate layers 5 are etched so as to have the same pattern as that of the intermediate layer 8 as patterned in the step of FIG. 2F. This etching may be carried out by either dry etching or wet etching.

With the wet etching, the pattern is formed by immersion into an etchant which can dissolve the HL alternate layers 5 to be etched and which can not dissolve or can dissolve with difficulty the intermediate layer 8 as a mask material. However, the side etching also proceeds simultaneously during the pattern formation, when a shape with a high aspect ratio is to be formed, this need to be sufficiently taken into consideration when designing the shape. Further, the dry etching is particularly effective when forming a thin linear pattern.

As the dry etching, RIE (Reactive Ion-beam Etching) can be used. Alternatively, ICP (Inductively Coupled Plasma) RIE can be used which employs a fluorine-based gas as an etching gas. By forming a high density plasma atmosphere, etching can be performed at a high speed of 1 to 10 $\mu$m/min. Further, when the intermediate layer is formed of a metal, the etch selectivity for the metal material is as high as 200:1 for an oxide film and 100:1 for a resist. Therefore, these methods are suitable for forming a shape with a high aspect ratio such as, e.g., 30.

Figure 2H:
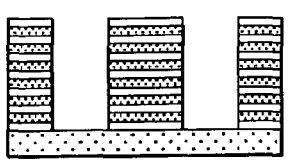

Then, as shown in FIG. 2H, the resist layer and the intermediate layer are stripped. The stripping may be carried out by either a dry process or a wet process, and either one of these processes may suitably be selected according to the etch selectivity for the material to be stripped and the material of the patterned HL alternate layers 5. Specifically, it is possible to use a commercially available resist stripper, oxygen plasma ashing, or the like. Further, the previously described etchant can be used to strip the intermediate layer.

Finally, the member formed through the above steps is washed as needed to obtain the polarizing beam splitter 1.

In the present embodiment, the intermediate layer 8 is formed in the step of FIG. 2B. However, the intermediate layer 8 is not necessarily required. It is possible to form the resist film 9 directly on the HL alternate layers 5 without forming the intermediate layer 8 and to effect patterning and etching. However, when the intermediate layer 8 is not formed, the HL alternate layers 5 located below the resist need to be protected with the resist film 9 during the etching step. To accomplish this, the resist film 9 need to be thick to a certain degree. However, as described above, when a fine pattern is to be formed, the resist film need to be formed as thinly as possible. Thus, it is more preferable that the intermediate layer 8 is formed on the HL alternate layers 5 and then patterning and etching are performed.

Now, description will be given of specific example of the present embodiment.

EXAMPLE 1

The polarizing beam splitter 1 shown in FIG. 1 was manufactured, and its characteristics were experimentally investigated. The polarizing beam splitter 1 manufactured was formed of the high refractive index layers 4 of $TiO_2$ and the low refractive index layers 3 of $SiO_2$ alternately stacked on each other on the transparent substrate 2 of quartz which was 30 mm in length, 30 mm in width, and 1 mm in thickness. In this case, the $TiO_2$ layer had a thickness of 68 nm, and the $SiO_2$ layer had a thickness of 118 nm. These values were designed to allow the polarizing beam splitter to provide sufficient functions on the basis of the light beam incident angle of 45°. The lines 6a, 6b, 6c, 6d of the multilayer film each had a width L of 100 nm, and the interval S between the adjacent lines 6a and 6b, 6b and 6c, and 6c and 6d of the multilayer film was 100 nm. Further, the width P of each of the connecting multilayer films 7a, 7b, 7c, 7d, 7e, 7f was 100 nm, and the interval W between the connecting multilayer films 7a and 7b, 7c and 7d, and 7e and 7f was 2 $\mu$m.

To manufacture the polarizing beam splitter 1, a vacuum evaporation method was used to alternately stack $TiO_2$ layers as the high refractive index layers and $SiO_2$ layers as the low refractive index layers on the transparent substrate 1 of quartz subjected to cleaning, thus forming the HL alternate layer 5. At this time, the substrate temperature was 250° C., and oxygen was introduced so as to establish a degree of vacuum of 0.02 Pa. An evaporation source was heated by the electron beam heating to form the multilayer film. Further, the thickness control was performed by the interference control method using a monochromatic filter (FIG. 2A).

Then, the intermediate layer 8 made of metal chromium used as a mask during the etching step was deposited to a thickness of 250 nm using a similar heating method. In this case, the degree of vacuum was 0.001 Pa, and the thickness control was effected using the quartz crystal oscillator method (FIG. 2B).

Then, after performing cleaning and UV/O3 processing, a photoresist was spin-coated on the intermediate layer 8 to form the resist layer 9. The photoresist used was positive chemical amplification resist KRF M20G (trade name) manufactured by JSR. Further, the resist layer had a thickness of 100 nm (FIG. 2C).

Then, after pre-bake at 110° C. for 180 seconds, exposure was carried out using a demagnifying optical system stepper (NA=0.6) with KrF excimer laser as a light source. The mask used was a Levenson type phase-shift mask, and the pattern shape corresponded to the shape of the linearly shaped multilayer films 6a, 6b, 6c, 6d and the connecting multilayer films 7a, 7b, 7c, 7d, 7e, 7d. The exposure dose was 34 mJ/cm² (FIG. 2D).

After the exposure, PEB was carried out at 120° C. for 120 seconds. Then, a paddle development was performed for 30 seconds using 1.18% TMAH (tetramethylammonium hydroxide) solution. Then, cleaning with water was quickly carried out and then drying was performed on a hot plate at 100° C. for 2 minutes (FIG. 2E).

Next, the resist layer 9 was used as a mask to wet-pattern the chromium layer as the intermediate layer 8. The etchant used was a solution obtained by dissolving 15% by weight of secondary cerium ammonium nitrate ($Ce(NH_4)_2(NO_3)_6$) in a 0.5% by volume aqueous solution of concentrated nitric acid. After paddle etching was carried out for 2 minutes using this solution, cleaning with water was quickly carried out and then drying was performed on a hot plate at 100° C. for 2 minutes (FIG. 2F).

Subsequently, the member was placed in an RIE (Reactive Ion-beam Etching) apparatus, and the HL alternate layers 5 were etched using the intermediate layer 8 as a mask. The etching gas used was a mixed gas of $CF_4$ and $H_2$. Furthermore, oxygen was used as an etching gas to strip the resist layer 9 on the surface (FIG. 2G).

Finally, the member was immersed in the chromium etching liquid mentioned above to dissolve and strip the intermediate layer 8 of metal chromium used as a mask. Then, the member was cleaned with water shower and then dried on a hot plate at 100° C. for 2 minutes, thereby obtaining the beam splitter 1 having the linearly shaped multilayer film of a high aspect ratio and the connecting multilayer films formed on the surface of the transparent substrate (FIG. 2H).

Figure 3:
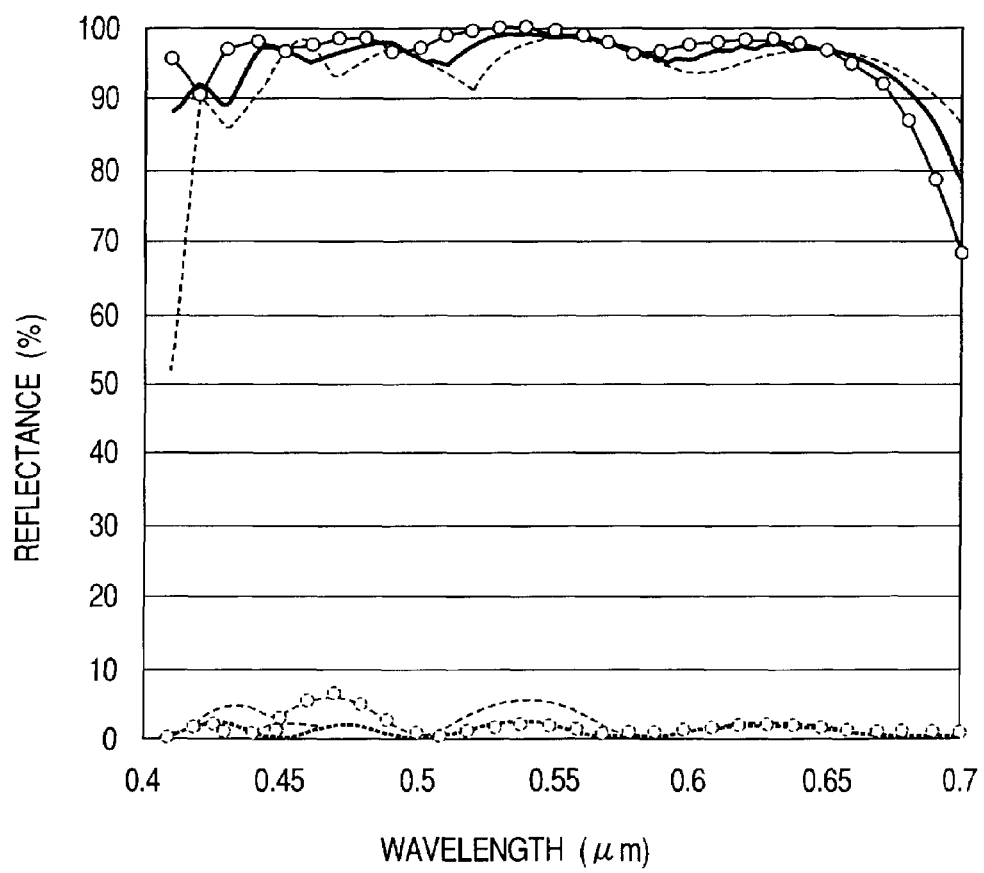
FIG. 3 is a graphical representation showing the spectral characteristics of an optical component according to Example 1.

At this time, the spectral reflectance of the beam splitter 1 was measured using a spectrophotometer (U4000 Self-recording Spectrophotometer manufactured by Hitachi). The results are shown in FIG. 3. In this case, the polarizing beam splitter was so arranged as to reflect an S-polarized component of the measured light and to pass a P-polarized component therethrough. In FIG. 3, the axis of abscissa indicates the wavelength of light, and the axis of ordinate indicates the reflectance at that time. In the figure, the S-polarized component exhibits an average reflectance of more than 80%, while the P-polarized component exhibits an average reflectance of less than 10%. Further, the thick solid line indicates reflectance characteristics observed at an incident angle of 45°; the dotted line indicates reflectance characteristics observed at an incident angle of 40°; and the solid line with circles indicates reflectance characteristics observed at an incident angle of 50°.

COMPARATIVE EXAMPLE 1

Figure 4:
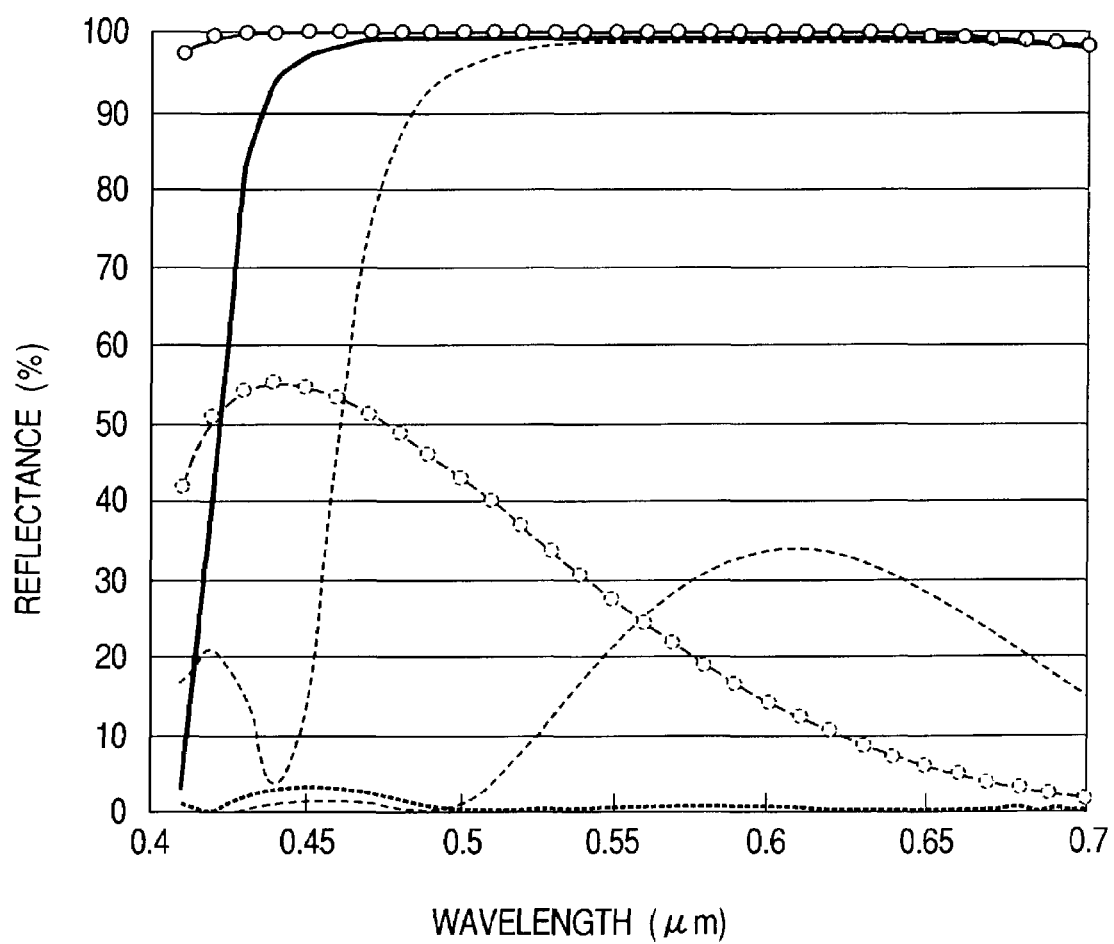
FIG. 4 is a graphical representation showing the spectral characteristics an optical component according to Comparative Example 1.
Figure 5:
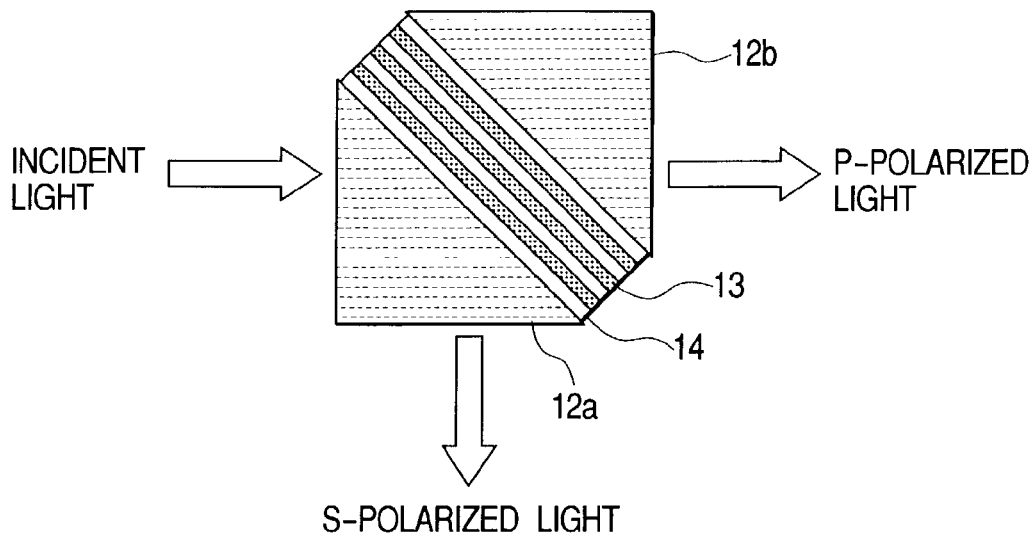
FIG. 5 is a sectional view showing a conventional interference film cubic type polarizing beam splitter.
Figure 6:
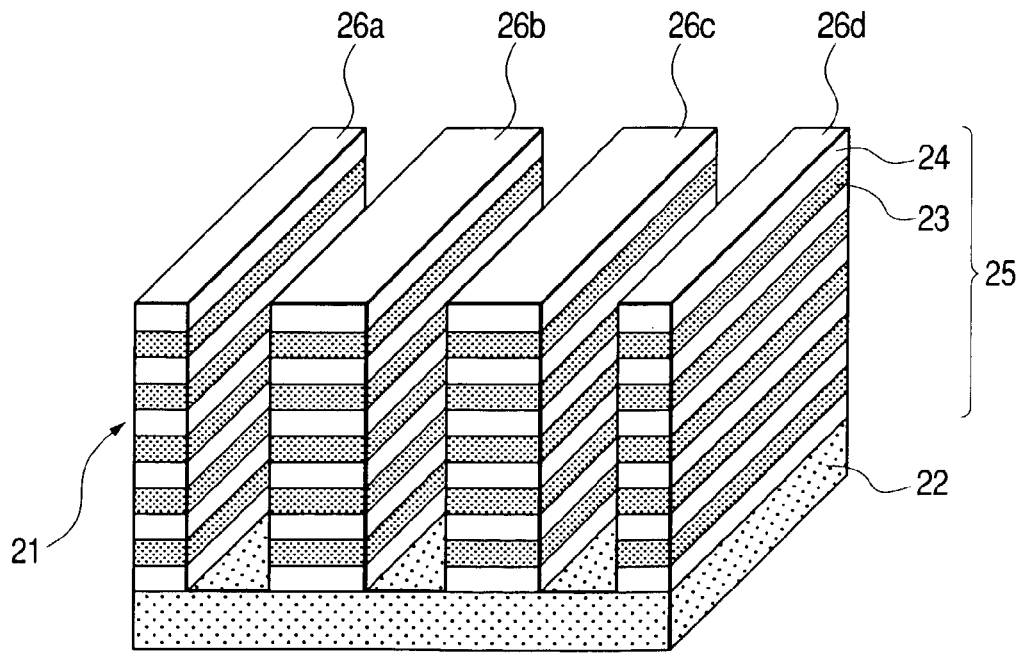
FIG. 6 is a sectional view showing a conventional polarizing beam splitter.

For comparison, an interferencing film cubic type polarizing beam splitter shown in FIG. 6 was formed using the same multilayer films as those formed in Example 1, and its spectral reflectance was measured using the spectrophotometer (U4000 Self-recording Spectrophotometer manufactured by Hitachi). The results are shown in FIG. 4. In this case, the optical glass material used was Glass S-LAM60 (trade name; n=1.74; manufactured by OHARA INC.). In FIG. 4, the axis of abscissa indicates the wavelength of light, and the axis of ordinate indicates the reflectance at that time. In the figure, the S-polarized component exhibits an average reflectance of more than 80%, while the P-polarized component exhibits an average reflectance of less than 60%. Further, the thick solid line indicates reflectance characteristics observed at an incident angle of 45°; the dotted line indicates reflectance characteristics observed at an incident angle of 40°; and the solid line with circles indicates reflectance characteristics observed at an incident angle of 50°.

The results of measurements according to Example 1 and Comparative Example 1 will be compared with each other. In order to improve the function of the polarizing beam splitter, the spectral characteristics of each polarized component need to show a reflectance of 80% or more for a reflected light and a reflectance of 20% or less for a transmitted light. It can be seen from FIG. 3 that the polarizing beam splitter according to Example 1 exhibits very good spectral characteristics in the wavelength region of visible light of 0.4 to 0.7 μm. In contrast, with the polarizing beam splitter according to Comparative Example 1, as is seen from FIG. 4, sufficient spectral characteristics are not exhibited for the S-polarized component at 0.40 to 0.45 μm at an incident angle of 45°, the S-polarized component at 0.45 to 0.50 μm at an incident angle of 40°, the P-polarized component at 0.55 to 0.65 μm at an incident angle of 40°, and the P-polarized component at 0.40 to 0.50 μm at an incident angle of 50°. Particularly, it can be seen that Example 1 exhibits significantly improved P-polarized light characteristics when the incident angle varies, in comparison with Comparative Example 1.

Further, the spectral characteristics were measured for all the surface of the polarizing beam splitter 1 according to Example 1. All the results of measurements were good spectral characteristics like those shown in FIG. 3.

COMPARATIVE EXAMPLE 2

Next, as Comparative Example 2, a polarizing beam splitter was prepared following the same procedure as Example 1 with the exception that no connecting multilayer film was provided between linear dielectric multilayer films 26a, 26b, 26c, 26d as shown in FIG. 6.

Figure 7:
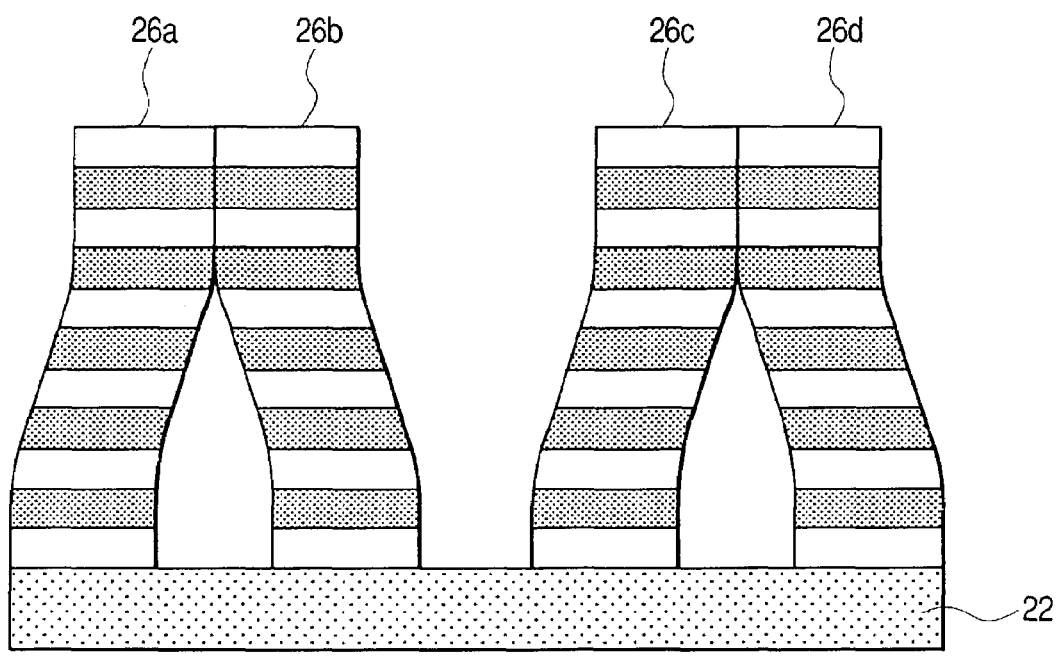
FIG. 7 is a sectional view illustrating problems to the conventional polarizing beam splitters.

When visually checked, the thus prepared polarizing beam splitter appeared opaque in white at the periphery of the substrate, so that it was clearly unacceptable as an optical component. To investigate in further detail, the whitish opaque part was observed with an SEM. As a result, the linearly shaped multilayer films were found to be inclined at the whitish opaque part as shown in FIG. 7. Thus, the interval between the adjacent linear multilayer films was very small at some portions, and there were found those portions where the adjacent linear multilayer films were in contact with each other to have no interval therebetween. Further, at some portions, the interval was very large, and there were some portions where the interval was almost twice as large as the normal interval. The interval between the adjacent linear multilayer films is designed to allow the resulting polarizing beam splitter to exhibit sufficient polarization characteristics. In particular, when the interval increases, the designed central wavelength will shift to a longer wavelength side to markedly degrade the polarization characteristics of the polarizing beam splitter. Therefore, the polarization characteristics of the polarizing beam splitter of Comparative Example 2 are clearly inappropriate to provide a sufficient function.

As described above, the present invention is characterized in that the linear multilayer films each of a width smaller than the wavelength of visible light are formed such that the interval between the adjacent linear multilayer films is smaller than the wavelength of visible light and that the connecting multilayer films are used to connect the adjacent linear multilayer films to each other to reinforce them. Thus, even when the protrusion formed of the multilayer film on the transparent substrate and the recess having no multilayer film formed therein have a high aspect ratio, the multilayer films will not fall down, thus providing a highly reliable optical component. This configuration is effective particularly when the aspect ratio is 4 or more.

The present invention provides an optical component that can exhibit good polarization characteristics for visible light of a wavelength of 400 to 700 nm and can stably maintain, during a manufacturing process or practical use, the shape of multilayer films with fine recesses and protrusions formed on an optical element surface, even when the multilayer films have a high aspect ratio. Further, the optical component can surely be manufactured with fine recesses and protrusions using an inexpensive manufacturing apparatus without use of any organic solvent, which is favorable to the environment protection.

What is claimed is:

1. An optical component comprising:
    a substrate; and
    a multilayer film having two kinds of alternately stacked layers of different refractive indexes formed on said substrate, said multilayer film being formed in a shape of a crib of a pattern consisting of those parts having said multilayer film formed on said substrate and those parts having no multilayer film formed on said substrate,
    wherein those parts of the crib shaped multilayer film which are arranged parallel to each other in one direction each have a width smaller than a wavelength of visible light and are adjacent to each other at an interval smaller than the wavelength of visible light, and
    wherein those parts of the crib shaped multilayer film which are arranged parallel to each other in another direction each have a width smaller than a wavelength of visible light and are adjacent to each other at an interval which is five or more times the wavelength of visible light.

2. The optical component according to claim 1, wherein said crib shaped multilayer film has an aspect ratio of 4 or more.

3. A method of manufacturing an optical component having a crib shaped multilayer film formed on a substrate, comprising the steps of:

alternately stacking two kinds of films of different refractive indexes on a substrate composed of an optical element to form a multilayer film;
    forming an intermediate layer on said multilayer film;
    forming a resist layer on said intermediate layer;
    patterning said resist layer in a shape of a crib, wherein those parts of said crib shaped multilayer film which are arranged parallel to each other in one direction each have a width smaller than a wavelength of visible light and are adjacent to each other at an interval which is five or more times the wavelength of visible light;
    etching said intermediate layer using said resist layer as a mask;
    etching said multilayer film using said intermediate layer as a mask; and
    removing said intermediate layer and then performing cleaning.

4. The method according to claim 3, wherein said crib shaped multilayer film has an aspect ratio of 4 or more.

5. An optical component comprising:
    a substrate;
    a multilayer film on the substrate having two kinds of alternately stacked layers of different refractive indexes, said multilayer film comprising a plurality of parallel linear parts each having a width of the linear part smaller than a wavelength of visible light and being arranged at an interval between adjacent parallel linear parts smaller than the wavelength of visible light; and
    a plurality of connecting parts that connect adjacent said parallel linear parts to each other; wherein each connecting part of said plurality of connecting parts has the same multilayer stack structure as that of said multilayer film and has a width smaller than the wavelength of visible light; and
    wherein adjacent said parallel linear parts are connected to each other at least at two positions by said connecting parts, and the interval between the adjacent connecting parts is five or more times the wavelength of visible light.

6. The optical component according to claim 5, wherein said multilayer film is formed in the shape of a lattice.

* * * * *